April 19, 1932. W. B. JONES 1,855,149
METHOD AND MEANS FOR THE VENTRILOQUIAL PRODUCTION OF SOUND
Filed April 13, 1927 2 Sheets-Sheet 1
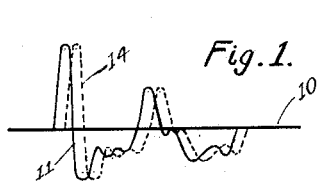
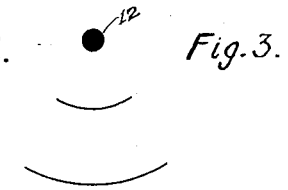
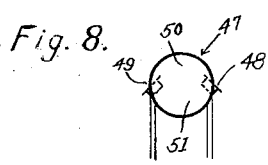
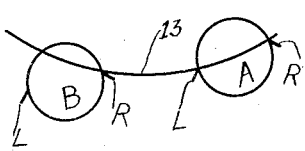
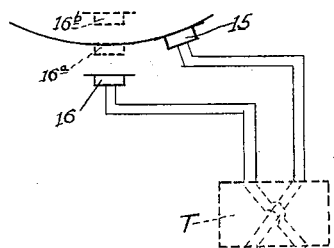
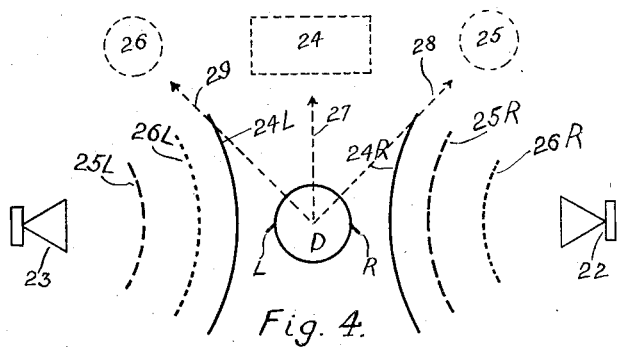
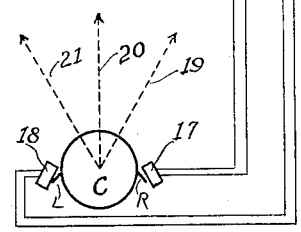
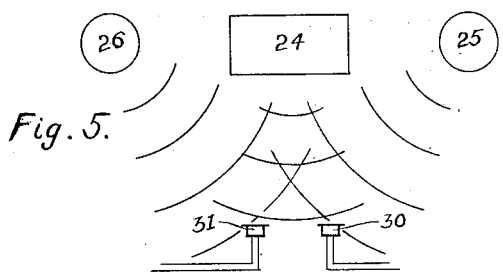
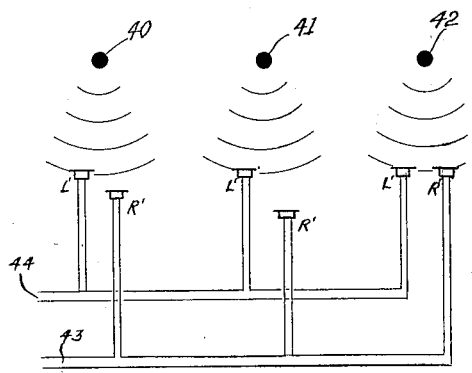
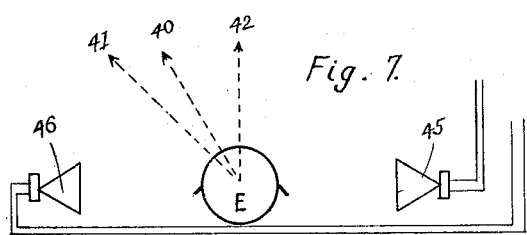
Inventor:
W. B. Jones.
By M. F. Cargill atty.

April 19, 1932.   W. B. JONES   1,855,149
METHOD AND MEANS FOR THE VENTRILOQUIAL PRODUCTION OF SOUND
Filed April 13, 1927   2 Sheets-Sheet 2
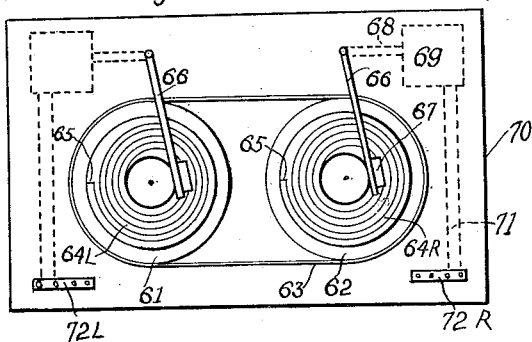
Fig. 9.
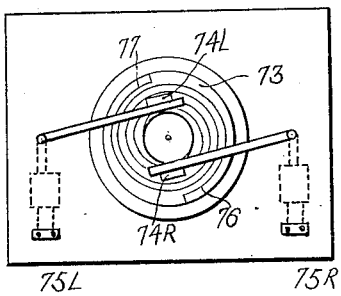
Fig. 10.
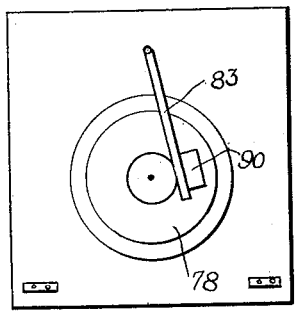
Fig. 11.
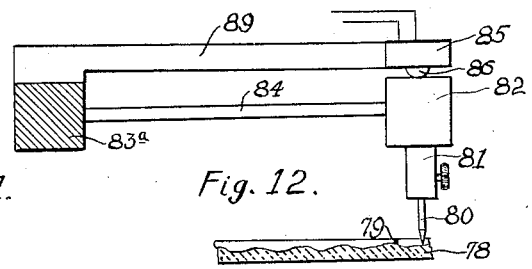
Fig. 12.
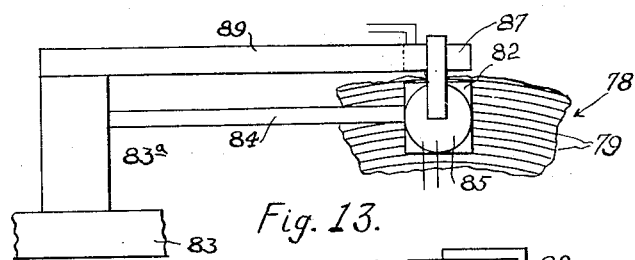
Fig. 13.
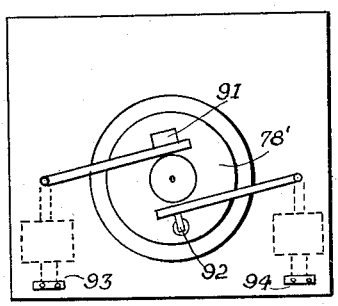
Fig. 15.
Fig. 14.
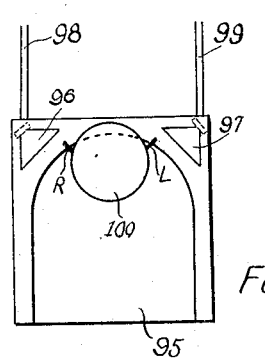
Fig. 16.
Inventor:
W. B. Jones.
By M. F. Cargill atty.

Patented Apr. 19, 1932

1,855,149

UNITED STATES PATENT OFFICE

W. BARTLETT JONES, OF CHICAGO, ILLINOIS

METHOD AND MEANS FOR THE VENTRILOQUIAL PRODUCTION OF SOUND

Application filed April 13, 1927. Serial No. 183,414.

The invention relates generally to sound, and in particular to the production of sound, or the transfer, or the recording of sound with the subsequent reproduction. It provides a means and a method for securing space effects with sound origins, both stationary and moving, and preferably those which are comparable to the stereoscopic effects with light. It relates particularly to the transmission of sound to the brain in such a manner that virtual origins of sound are produced. The invention makes use of the so-called binaural principle of sound reception.

The difference in vision with two eyes as compared to vision with one eye is well known, and is well illustrated in the use of stereoscopic lenses for viewing pictures to secure the impression of space in the picture. A number of methods have recently been proposed and practiced for producing stereoscopic motion pictures and similar stage effects. The advent of the so-called talking motion picture presents not only a possibility for the application of stereoscopic effects, but also a field for the location of sound origins in accord with the picture. It is an obvious defect even in the one-eye-view or non-stereoscopic talking picture of the present time that all the sound issues from one point. There is no distinction as to the source of sound issuing from a speaker at the left of the screen and from one at the right of the screen. The same constancy of origin is characteristic of all radio and phonographic reproduction. All the sound issues, not only actually, but apparently from the reproducer employed.

One aim of the present invention is to secure a space effect, so that, in spite of the fact that the sound issues actually from reproducing means, it will appear to the listener to come from a point out in space apart from the reproducing means. Thus, where an orchestra is reproduced, it will not appear to the auditor that each instrument is located at the same point, but that the various instruments are placed at different places angular to the auditor and that some are closer than others.

Broadly, then, the primary aim of the invention is to produce a virtual origin for sound, especially for reproduced sound. In this connection it may well be stated that the virtual origin so produced is susceptible to motion with respect to the listener, including its angular relationship to the listener as well as its apparent distance from the listener; and further, that two or more virtual origins may be located and shifted each independently of the other.

In explaining the nature of the invention it is necessary to refer to a few of the fundamental physical laws underlying the transmission and the reception of sound. Under certain normal or ordinary conditions sound travels in the air at the rate of 1083 feet per second. Sound is transmitted as a wave motion of the air, comprising advancing regions of compression and rarefaction of the air. Each sound is usually a train of waves heterogeneous in character, rather than a single wave. A pure musical tone is a train of waves equally spaced, the space between similar points in adjacent waves being called the "wave length". For middle C in the musical scale the wave length is 4.23 feet. I will therefore take a pure tone as middle C, for explaining the nature of the invention.

The sound waves from middle C from an actual origin are continually generated so long as the origin vibrates to disturb the air. The waves are spaced 4.23 feet apart, and they travel at the rate of 1083 feet per second. Such a wave will therefore travel at the rate of 1 inch in 0.000077 seconds (or 1 sound-inch)
2 inches in 0.000154 seconds (or 2 sound-inches)
3 inches in 0.000231 seconds (or 3 sound-inches)
4 inches in 0.000308 seconds (or 4 sound-inches)
5 inches in 0.000385 seconds (or 5 sound-inches)
etc.

If one's right ear and left ear are so positioned that each ear is affected simultaneously by a wave, each ear will hear the same thing at the same time. This condition obtains when one faces an on-coming wave. The origin will, therefore, appear in a direct line with the listener. By "direct line" it is hereinafter to be understood that I mean the plane which is perpendicular to and which bisects the line extending through the head from ear to ear.

However, if one's head is turned at an angle to this direct line of the former position, so that the left ear is farther from the sound origin than the right ear, then the left ear drum will not be vibrated until after the right ear drum. If the sound must travel an inch farther to reach the left ear than to reach the right ear, it will strike the left ear 0.000077 seconds after it has struck the right ear. If it must travel five inches farther before reaching the left ear, it will arrive 0.000385 seconds later than it arrives at the right ear.

Just as the brain has learned to measure space by the angular difference in the visions of the left and right eyes, so does the brain judge direction of sound origins by the lag of sound in one ear after its registration in the other ear. A few simple experiments with a blindfolded person will confirm the statement that the brain, acting through the sense of hearing alone, is a very poor judge of the direction of sounds, and that the other senses aid in guiding the brain to judgment and to interpretation as to direction of the sound waves received by the two ears. For example, a sound produced directly ahead of one may be located only as lying in the vertical plane above referred to. It is not possible alone by the sound wave to produce a distinction between sound origins above and below the level of the head. Likewise, a sound produced at an angle to the listener can be judged approximately as to origin, the angle horizontally being fairly certain, but the angle vertically being indefinite. The distance also is uncertain. In locating a sound of a prolonged nature, the head automatically shifts to sense the source from different angles, and then it automatically takes intersections to estimate the location. Intelligence aids greatly in locating origins, and it is only by the artful appeal to other senses that the ventriloquist is able to deceive the ear. The present invention also permits of appeal to other senses to aid in deceiving the ear, but the present invention is to be distinguished from ventriloquism as it is commonly known, by the fact that the subjective action, or ear-reception, is normal, and the objective action, or generation, is abnormal.

So far as I have been able to determine, a number of text books in physics and physiology, including the Encyclopedia Britannica, ascribe the sensing of direction of sound to the difference in intensity at the two ears. I have determined that the distinguishing element is a time factor and not an intensity factor, although I do not claim to have discovered this fact. The auditory and the optic nerves are alike in one respect: that they both divide and send a branch to each side of the brain. A sound heard in one ear affects both the left and the right sides of the brain. Whatever the physiological action is, the effect is somewhat comparable to vision. It may readily be demonstrated that it is the time interval between ear receptions that indicates angularity of a single sound origin. By holding to the ears the ends of two independent rubber tubes of equal length, and exposing the other ends to a source of sound, as a speaker or a phonograph, the angularity perceived at the ears may be made to vary according to the difference in time which elapses for a given wave front to strike the two exposed ends. By moving the end of one tube in a circle (both being directed towards the source of sound) about the other, say of five inches radius, the origin will appear to the listener to be travelling in a circle about the head of the listener.

Such an experiment may be modified so that the two tubes become confluent for similar portions of their length. The advance and lagging effects are thus combined, in the confluent portion, into a compound wave, which then divides so that each ear receives the same effect at the same time. In this instance there is no indication of angularity when the exposed ends are differently exposed to a wave front.

From such experiments I have drawn several conclusions as to the reception of sound by the ears. A time interval of zero between the receptions by the right and the left ears gives an indication of an origin directly ahead of the listener. A time interval of a sound-inch indicates a slight angular position for the source of sound. An interval of from three to four sound-inches indicates an angular direction of about 45°. An interval of about six-sound-inches indicates about 90°. In spite of actual intensities, the sound seems more intense in the ear which receives the effect first. The intensity at the first-hearing ear appears to be augmented by a later reception of the same sound at the other ear.

One object of the invention, then, is to pick up a sound wave at two different points corresponding practically to "ear locations" and to transmit or record the two effects for presentation to two ears. In this way vibrations of substantially the same character are picked up at two different times, sufficiently different to give a time interval which can be distinguished and interpreted in accordance with custom by the brain as indicating an origin at some angle to the listener. The presentation to the brain is brought about by presenting the advance effect to one ear and the lagging effect to the other ear.

It is well known that a great many sound waves may be compounded into a single wave and that the brain can resolve the single wave into its components. It is upon this principle that the phonograph, the radio, and the telephone depend in part for their success. Accordingly, it is possible to compound the right-ear effects of several origins for presenting a compound right ear effect to a right ear; and likewise to compound left-ear effects of the same origins for a left ear. The brain, upon receiving these two compounded effects, one at each ear, will readily resolve the compound wave into its components, and thereby discover that for each origin there are two components which are substantially identical in form and that one lags behind the other. The mind is accustomed to receive a wave in one ear which lags behind a similar wave in the other ear, and to interpret the lag, under normal conditions, as an indication of the real origin of that wave. But under the presently described conditions of reproduction, there is no such actual origin, so that there will be created a virtual origin whence the sound seems to originate. The angular direction of each virtual origin as to the listener will be determined by the time interval between the right and left ear components. The distance along the direction of the virtual origin will be somewhat indicated by the relative intensities, as will appear hereinafter.

Practice of the invention, therefore, virtually takes the origin of reproduced sound out of the reproducing apparatus and places it in space apart from such apparatus. It provides for the ventriloquial reproduction of several and separate origins. Furthermore, the number of origins may be regulated at the will of the picking-up operator, and they may be made to appear upon reproduction in relations one to the other which are not the same as the original relations where picked up. Not only may the origin of the reproduced sound be made a virtual one but the location of it may be moved during a performance without the necessity of the actual source at the picking-up station being moved in the least. The mere manipulation of the parts of the picking-up device with respect to the actual origin will produce upon reproduction the effect of a moving virtual origin.

In the accompanying drawings there are shown a number of diagrammatic illustrations of the principles involved in this invention, some arrangements for picking up recording and reproducing apparatus, and specific applications of the invention.

Fig. 1 represents a right ear effect and a left ear effect of a particular sound wave from an angular source expressed in the timed relation at reception.

Fig. 2 is a diagrammatic representation of two listeners differently positioned relative to the same source of sound.

Fig. 3 is a diagrammatic representation of the independent transfer of right and left ear effects from a picking-up station to an auditory station.

Fig. 4 is a diagrammatic representation of an auditory station wherein three virtual origins are produced.

Fig. 5 represents a picking-up station which produces the effect of Fig. 4.

Fig. 6 is a multiple type picking-up station.

Fig. 7 is an auditory station showing the effect upon a listener of transmission from the picking-up station of Fig. 6.

Fig. 8 represents a picking-up device in the form of a dummy head with microphones for ears.

Fig. 9 represents a recording or reproducing means for companion sound records synchronized in operation.

Fig. 10 represents a phonographic reproducing means for a dual effect sound record.

Fig. 11 represents a phonographic reproducing means for a single-track dual effect sound record.

Figs. 12, 13 and 14 are respectively elevation, plan and end views of a duplex pick-up device for the apparatus of Fig. 11.

Fig. 15 is a modified phonographic reproducing or recording apparatus for a modified single-track dual effect sound record.

Fig. 16 is a particular auditory station for the invention in the form of a chair.

In order better to explain the invention reference is made to Figs. 1 and 2 of the drawings. In Fig. 1 the line 10 represents a time axis and the curve 11 a wave form (as in a telephone circuit) of the letter "a" as in "father" at the tone of middle C. The wave length is 4.23 feet. In Fig. 2 the point 12 is indicated as the origin of this sound wave which is travelling towards two listeners A and B. The listeners are represented in a diagrammatic plan view of the head showing the ears L and R corresponding respectively to the left and right ears. The arc 13 represents the sound wave at a moderate distance from the origin 12.

In the case of A the wave 13 reaches L and R simultaneously, so that each ear receives a sound wave corresponding to wave 11 of Fig. 1.

In the case of B, R is closer to the origin and receives the wave 13 as do the ears L and R of A. But B's ear L is placed, say three inches, farther from the origin than R. After the wave strikes B's ear R, it will then need to travel three inches before B's ear L receives it. This will take 0.000231 seconds. Curve 14 of Fig. 1 represents the wave effect received at L in its timed relation to the effect of the same wave received at R. Of course the intensity of the wave 14 may be slightly less than the intensity of wave 11, but for the present this factor will be neglected. It is primarily the time difference in reception by the two ears that indicates the angle of the origin from the listener.

If the ears L and R are replaced by pick-up devices in the same locations, it will be possible to transfer the effect at R to the right ear of a listener, and the effect at L to a left ear of a listener, thus to reproduce the same angular location to the listener as a virtual direction. In Fig. 3 there is shown a method for doing this. The origin is herein indicated by the numeral 12 as before. Two sound pick-up devices such as microphones 15 and 16 are presented to the wave from the origin 12. The microphone 15 is nearer the source 12 by three inches than the microphone 16. This arrangement will pick-up sound under conditions described as to B in Fig. 2. At a distant point a listener C employs a reproducer for each ear, 17 for R and 18 for L, arranged respectively to reproduce the effects picked up at 15 and 16. The intermediate connections 15 to 17 and 16 to 18 may be any means such as radio transmission apparatus, telephone circuits, phonograph or other sound records, etc., all being indicated by the letter T, meaning transmission means. This arrangement is characterized by the fact that L is screened from the effect picked up at 15 for R, and R is screened from the effect picked up at 16 for L. With this arrangement the virtual origin will appear to C along the line 19. By moving the pick-up 16 toward the source 12 the virtual origin may be made to shift angularly. For example, when the pick-up 16 is moved to the position 16ª, at the same sound wave distance from the origin 12 as the pick-up 15, the virtual origin appears to C along the line 20. When the pick-up 16 is moved to position 16ᵇ, ahead of pick-up 15, the virtual origin appears along the line 21 to the left.

The preferred and practical arrangement, however, is not to screen one ear completely from the effect produced for the other ear, as has been described with reference to Fig. 3. No practical harm is done by the failure so to screen, but improved results are obtained. I have found that the ear phones of Fig. 3 are not necessary to secure the virtual effect. The so-called loud speaker may be used as a reproducer in place of the ear phone and may be located more remotely from the ear. With such an arrangement as shown in Fig. 4 a listener may position himself equidistant from two reproducers 22 and 23. By "equidistant" I mean in such a position that the sound path from the reproducer 22 to the right ear R of a listener D is substantially the same as the sound path from the reproducer 23 to the ear L. There is a limitation to the true relation, because the effect is most marked when the reproducers are directed towards each other and the listener is between them at no great angular position to the line joining the reproducers. This position gives the maximum screening effect. As the listener and the reproducers depart from this preferred arrangement the effect will vary according to the variation in time interval produced. It is obvious that the two reproducers could not be placed side by side and the listener stand before them. The two waves from each would thus be merged practically into a single wave and the effect would be practically destroyed, permitting only an angular shift between the two locations. The aim is to prevent the advance effect at the first ear from striking the second ear until the lagging effect has been recorded at the second ear. Referring to Fig. 4 the listener D is positioned between the two reproducers. The right ear effect arises in reproducer 22 and the left ear effect in reproducer 23. Each reproducer emits a single compound wave which is herein shown as compounded of sound waves as from a piano 24 (see Fig. 5), a violin 25 and a singer 26. The compound wave from each reproducer may be expressed as its components. From reproducer 22 there are components 24R, 25R and 26R, and from reproducer 23 there are components 24L, 25L and 26L. The piano components 24R and 24L are shown as issuing from the reproducers at the same time, indicating an origin in line with the listener as in the direction 27. The violin component waves 25R and 25L are not emitted simultaneously and the component 25R is the advance one. The violin, therefore, will appear on the right of the listener D in the direction 28. Similarly, the singer component waves 26R and 26L are out of phase with 26L in advance. The singer appears to the left of the listener in the direction 29.

Fig. 5 shows a practical method of picking up to produce the effect of Fig. 4. Two microphones 30 and 31 are positioned relative to the sources 24, 25 and 26, just as the ears R and L of the listener D are shown in Fig. 4, i. e., the microphones are in the same relation to the real origins as the ears are to the virtual origins. Picking up by the arrangement of Fig. 5 will produce the compound waves issued at reproducers 22 and 23 in Fig. 4. Should the singer 26 move over to the position of the violin 25, the time interval between the component waves 26R and 26L will vary through zero and reverse, and the angular direction observed by D will shift from the left to the right in accordance with the changing time interval. The singer may also approach the microphone 31 and whisper into it with the substantial exclusion of microphone 30 from the effect of the whisper, thus to give to the listener the effect of whispering into the corresponding ear L.

It is not necessary to use the simple arrangement as shown in Fig. 5 for a recording station. The invention also provides what is termed a multiplex pick-up station. Each origin may be separately picked up by two microphones and these may be moved about or fixedly positioned to effect a shifting of the origin or a given directional location for the virtual origin. Each pick-up station for each origin will be like that shown in Fig. 3. All the microphones R' will be connected into one series for compounding all the right ear effects, and all the microphones L' will be connected into another series for compounding all the left ear effects, as shown in Fig. 6.

In Fig. 6 there is indicated generally the pick-up arrangement for the above suggested plurality of origins. The three origins 40, 41 and 42 may be taken as representing three musical instruments. Two microphones R' and L' are employed for each origin. The distance between the two pick-up devices at origin 40 indicates an angular relation of 30°. At 41 the microphones are placed to indicate an angle of 45°. At 42 the angular indication is lacking and the instrument will appear in direct line with the listener. The microphones R' are connected into one circuit 43 in order to compound the three effects into a single resultant effect. The microphones L' are also connected into a single circuit 44 to compound the three effects into a single resultant effect. It will readily be understood that each compound resultant effect contains substantially the same tones; and each heard independently by both ears sounds the same. But the actual form of each effect differs from the form of the other because the components are compounded in a different phase relation. Upon reproducing the two compound effects, either by direct or indirect transmission, or after having made permanent records of them as for phonographs, the indicated angular locations of the instruments 40, 41 and 42 may be reproduced and the result will be somewhat as indicated in Fig. 7. In this figure 45 and 46 represent reproducers and E represents a listener. The angular directions of the virtual origins are represented by dotted arrows identified by the numeral employed to indicate the actual origin in Fig. 6.

As to the intensity of the waves, certain relations prevail which may be considered when producing a predetermined effect by a mechanical control of the pick-up devices. The unit intensity of a sound wave at different points is considered to be inversely proportional to the square of the distance of the particular point from the origin of the sound. This of course disregards the dissipation of the energy of the wave. Considering the intensity to be I, and the distance to be $d$, then $$I = k/d^2$$

where $k$ is a constant quantity.

At great distances from the origin the intensities may be considered as substantially equal for points which are but a few inches apart. At closer ranges the intensities will vary considerably within the space of a few inches. From the above formula it may be calculated that where the intensity at a point which is two feet from the origin is taken as unity, the intensity at a point two feet and three inches from the origin is only 0.79.

From the foregoing statements as to intensity it will be understood that when the angular relation of a head to the origin is changed there will be a much greater change in intensity at the two ears if the origin is closer than if the origin is quite removed from the listener. The fact that human ears are set upon the head at an angle rather than being directed always with full exposure to the origin, is another factor which changes the intensity observed by the ear. However, neglecting the angularity of the ears, it will be sufficient to indicate that for origins at considerable distances, the mere variation in the time interval between advance and lagging waves will suffice to indicate angularity.

For origins which are relatively near the listener the intensity changes so greatly with a change in angularity that an interpretable relation exists in the changing ratio. This relation will vary generally with the distance of the origin from the listener, and also with the individual ear-angle of the listener. It is therefore a variable relation as between individuals and serves only as a guide to approximate a desired result. The ratio of actual intensities under varying conditions is susceptible to approximation by simple rules and by the simple application of the known laws of physics. For example:

When one's two ears are placed each two feet from the origin, and the head is then turned about one ear as a pivot to place the other ear three inches farther from the sound origin, the intensity of the sound in the moved ear will be reduced by 21% (neglecting the changes due to the angularity of the ears and any obstructing effect of the head). Such a turn of the head will be through a moderate angle. Assuming the distance between the ears to be five inches, the angle may be calculated or graphically found to be about 37°. Accordingly, to indicate by means of this invention that the origin is to shift to an angular position of 37° from a former direct-line position, and that the moving origin is two feet ahead of the listener, it will be possible, irrespective of the actual relations of the two microphones to the actual origin of the picked-up wave to move one of them from an even line position to a new position three inches farther from the origin and at the same time to control the intensity of action so that there is a reduction of 21%. If the distance is to be three feet rather than two feet, calculation will show that the reduction in intensity need be only 14.5%. For a six foot distance the reduction in intensity will be 8%. Of course it will be understood that where the distance between the advance and the lagging waves is greater or less than three inches as given in these examples, other figures apply for the intensity reductions. For example, a four inch removal of the farther ear for a six foot distance to the origin requires a 10% reduction in intensity as compared to the 8% reduction for a three inch change. In practice such intensity changes may be made by screening a portion of the exposed area of the microphone or other equivalent means.

Such involved calculations for adjustment may be readily dispensed with to produce a predetermined effect. A special pick-up device may be provided and this device and the origin which it is to pick up are preferably isolated from other sounds. A pick-up device which acts as a human head with respect to the origin and the ears is employed, and this is preferably made as a dummy head with microphonic ears. By moving such a device relatively to the origin the desired effect will be obtained. In Fig. 8 there is shown a plan view of a dummy head 47 with two microphones 48 and 49 serving as substitutes for ears. The microphone-ears are placed upon the head in positions and in angular relations comparable to human ears on their head.

The portions of the head 50 and 51 serve as sound obstructions. The microphones may be slightly inserted into the head to simulate the position of the human ear drum within the head. It will be obvious that in using a device of this character, the virtual effects produced at the reproduction end will correspond to the actual conditions prevailing at the pick-up station.

The present invention may be applied in radio, theatricals and in phonographic reproduction. In radio, left and right ear effects may be transmitted in any manner as by broadcasting on two wave lengths and tuning in each effect with separate receiving apparatus. Multiplex, or duplex broadcasting systems suggest themselves as practical and as desirable, so that a single wave length may be used to broadcast two effects.

In theatricals, it has application to large auditoriums where distant hearing may be provided by equipping each seat with head phones, or with two equivalent reproducers, embodied into or secured to the seat so as to direct a right ear effect and a left ear effect to the seat occupant. Such an arrangement of course would require wiring the seats. It is very applicable to the talking moving pictures and will produce angular sound effects in keeping with the visual effect produced. Since the seats are to be wired for the present invention, the same wiring system may be combined with a stereoscopic apparatus for stereoscopic talking moving pictures. For example, the succeeding flashes on the screen may be alternately left and right eye views of the scene. The observer may view the pictures through electrically operated mechanical blinkers which close over the right eye when a left eye view is flashed, and vice verse. With such a dual function for a wiring system it is possible to obtain perfect reproduction of visual and auditory effects. The subject matter of this paragraph is continued and is more specifically described and claimed in my copending application Serial No. 496,434, filed November 18, 1930.

For phonographic reproduction two records may be made, one for the right ear effect and one for the left ear effect. The two records may be separately made and synchronized in operation upon reproduction. A film type or disc type record may be made with the two effects side by side, thus to dispense with synchronizing means. Also a disc type record may be made with one effect on each side. A double groove or side-by-side effect on a disc record would materially shorten the selection as compared to present practice, but this may be avoided by providing the two effects in one groove. Two types of sound groove are now employed, one varying vertically and one varying horizontally. A groove may be made which varies vertically for one effect and which varies laterally for the other effect. The positions of instantaneous effects may be separated or coincidental according to the type of apparatus provided for reproducing the records.

In the drawings there are shown some phonographic apparatus which may be considered either as the means for forming the record or as the means for reproducing the record, it being understood that the changes from one to the other, for practical purposes are well known in the art and form no part of this invention. I prefer to use electrical apparatus rather than the tone-arm and horn of the present day reproducer for the reason that such apparatus permits connection of a plurality of electrical reproducers for the practice of the present invention. It is however to be understood that this is not necessary and that an instrument may be made which operates upon the principle of the common phonograph without electrical parts. Using two reproducers, electrical or otherwise, the observer, in practicing the present invention, positions himself at an auditory station, that is, between the two reproducers and at substantially the middle point. The reproducers may be head phones, tone horns, sound conducting tubes, spaced reproducers. The latter may be embodied in a seat as described for theatrical performances, or as a part to be secured to a seat, or in a standard of some sort in proper relation to which the observer may position himself.

The foregoing description does not of necessity imply that the effect of a single pair of reproducers is limited to one, two or three people. Two people may easily be placed in one auditory station, and the greater the width of the station, the more people it will accommodate without losing the effect desired.

Fig. 9 represents apparatus for phonograph records and the parts shown may be considered as means for producing the records or as means for reproducing sound from the records. They will be described however as the reproducing means, but it is to be understood that they embody the present invention, and that a change from one form to the other is no part of this invention. In Fig. 9 the departure from common practice is the employment of two synchronized turntables 61 and 62 to carry a disc type record. For example, they are shown as synchronized by means of a belt 63. Two companion records 64R and 64L are provided each having one effect thereon. The records illustrated are of the groove type, and the start of the groove has a radial portion 65 which aids in positioning the records properly for synchronous reproduction in the proper phase relation. A swinging arm is provided for each instrument, both being identical and indicated by the numeral 66. The identity assures maintenance of the same relation to the records as the sound grooves are traversed. An electrical pick-up device 67 is employed which is connected by wires 68 to suitable reproducing or amplifying apparatus 69 within the cabinet 70. Leads 71 run from each apparatus 69 to left and right ear effect sockets 72R and 72L into which reproducers may be plugged.

When a side-by-side groove record is employed as shown with exaggeration in Fig. 10 at 73, two pick-up devices are employed for the one record. The two pick-up devices 74R and 74L are related to the turntable and the remainder of the apparatus in the manner described for Fig. 9. Two sockets 75R and 75L are provided for the two effects. I prefer that each pick-up device be stationed 180° behind the other, and therefore I construct the parts symmetrically to produce this effect, and provide a record with simultaneous effects 180° apart in the two side-by-side grooves 76 and 77.

For a single-groove two-effect record a special pick-up device is used which is capable of independently reproducing two right angular vibrations. A record of this type is shown at 78 in Figs. 11 to 14. A single sound groove 79 varies in depth for one effect and shifts laterally from the true spiral line for another effect. A groove-follower is provided as a needle 80 mounted in the socket means 81 which is carried on a block having the form of a cube 82. The phonograph of Fig. 11 has a swinging arm 83 with a lateral extension 83ª (Figs. 12 and 13). From the lateral extension 83ª a resilient or springy projection 84 extends parallel to the record and more or less in the direction of the tangents to the sound groove. The block 82 is carried by the member 84 so that it is free to vibrate laterally and vertically. Above the block 82 is a microphone element 85 with a ball contact 86 resting on the flat top of the cube. One lateral face of the cube has a similarly contacting microphone element 87 and ball contact 88. Each vibration may thus be recorded independently of the other. The microphones are mounted on a rigid member 89 which is carried by the extension 83ª. This type of device is represented generally in Fig. 11 by the numeral 90.

The single-groove two-effect record is preferred for the reason that a single groove follower will suffice to reproduce the two effects, thus eliminating the necessity for providing two pick-up devices and an attendant construction or adjustment to maintain the two groove followers in proper phase. I do not however exclude the form shown in Fig. 15 in which two pick-up devices are employed. 91 represents the well known form for lateral groove records, and 92 indicates the well known form for the vertically varying records. The record 78' of Fig. 15 is of course a modified form of the record 78 above described. Record 78 of necessity has two coincidental sound effects at every point in the groove 79. Since the apparatus of Fig. 15 provides two pick-up devices 91 and 92 which are 180° apart, it is necessary to provide a modified single-groove record 78' with simultaneous sound effects separated by 180°. Left and right sockets 93 and 94 are provided for plugging in suitable receivers.

In Fig. 16 there is shown a special chair 95 in the back of which are incorporated two reproducers 96 and 97 with leads 98 and 99 to be plugged into any of the illustrated phonograph instruments. A human head 100 is represented by the circle and its ears are designated R and L. The chair and the locations of the reproducers cause the ears L and R to be placed in proper position to receive the effects described herein. The device of Fig. 16 constitutes an auditory station. It is to be understood that the chair is a part of the combination only insofar as it serves to position the head in the region midway between the two reproducers 96 and 97.

The fact that a right and left ear effect sound record is provided always gives two versions of one recording. Therefore, when each effect is reproduced alone the reproduction is the same as in ordinary phonographs and there is in addition a choice between the two versions. When both versions are played together, but a listener is not positioned within an auditory station to receive the full effect of the invention, there is nevertheless an improved reception over the playing of a single version. The two effects from different sources blend together into a richer and more sonorous reproduction than attends the reproduction of but a single effect, as in the phonograph now in common use. Certain subject matter described and disclosed in the foregoing specification in connection with the invention here claimed will be found disclosed and claimed elsewhere in my copending applications, Serial No. 311,488, filed October 10, 1928; Serial No. 326,023, filed December 14, 1928; Serial No. 423,351, filed January 25, 1930; and Serial No. 496,434, filed November 18, 1930.

In this application I claim the pick-up devices and methods, and the complete process of and apparatus for picking-up, recording, and reproducing sound for true binaural effects.

I claim:

1. In combination, two sound pick-up devices positioned with respect to the origin of a sound wave so that each device receives and picks up the same wave at a different time, the differential time being comparable to the difference in time between impacts of a sound wave on the two ears of a human being, and means to vary the ratio of intensities of action of the same wave on the two devices in accordance with the difference in distance between them, the relation being predetermined by the desired angularity of the virtual origin and the desired distance of the virtual origin from the listener.

2. The method of creating a virtual origin for sound which comprises generating at an actual source a sound wave for one ear of a listener, and generating at a different source a later sound wave substantially the same in character for the other ear of the listener, the time interval between the waves corresponding to the differential time for a sound wave from the location of the virtual origin to travel to the respective ears of the listener, and regulating the ratio of the intensities of action of the two waves to correspond to the normal average ratio of intensities of a sound wave moving from the location of the virtual origin to the positions of said ears.

3. The method of producing shifting of virtual origins which comprises, transferring to human ears the effects at two points of sound waves from a given origin, each ear receiving one effect, varying the differential distance between the points and the origin of the sound wave, and varying the actual and relative intensities of the sound effects at the two points in a natural manner predetermined by the differential distance and the closeness of the origin, whereby to shift a virtual origin angularly on varying the distance between the points, and to indicate its closeness by varying the intensities in the predetermined manner.

4. A sound pick-up device comprising a dummy head with microphones arranged angularly to each other as substitutes for ears.

5. A sound pick-up device comprising two microphones angularly arranged substantially in the relation of two human ears, and a sound obstructing member positioned between said two microphones.

6. A sound pick-up device comprising two separated microphones located angularly to each other with exposed sound receiving areas angularly related comparable to human ears.

7. The method of securing virtual sound origins which comprises, recording a right ear effect and a left ear effect of sound waves from a plurality of origins, whereby producing different compound waves comprising substantially similar components in different phase relation, and transferring each effect independently to both ears of a listener, in such a way that the earlier effect at one ear reaches the other ear after the later effect has reached the other ear, whereby the similar components in different phase relation indicate characteristic angular virtual sources of sound, corresponding to the real origins recorded.

8. In transferring sound effects the steps of translating the effect of a sound wave at one location into variations of an electrical current, translating the effects of said wave at a more distant location from its origin into variations of another current, said locations being positioned with respect to the origin of the wave at points comparable to the locations of the ears of a listener with respect to the origin, utilizing said current variations to form two reproducible records of the sound, simultaneously reproducing sound from the two records, and simultaneously presenting each reproduced sound record to both ears of the listener in such a way that one effect arrives at each ear prior to the other effect.

9. A reproducing apparatus for phonographic records having binaurally related records, which includes two mechanically synchronized but independent reproducing units of the loud speaker type for the two sound records, said units having their sound distributing ends located apart from each other a distance greater than the width of a human head.

10. A reproducing apparatus for phonographic records having binaurally related records, which includes two mechanically synchronized but independent reproducing units for the two sound records, each unit comprising a pick-up device capable of translating the sound record variations into electrical current variations, and a loud speaking electrically operated sound reproducer.

11. The method of securing virtual sound origins which comprises recording a right ear version and a left ear version of a sound wave from a given source, reproducing each version, and transmitting each version by air path independently to both ears of a listener in such a way that the first and earliest effect at one ear fails to reach the other ear before the second and later effect reaches the other ear.

12. The method of securing virtual sound origins which comprises separately recording a right ear version and a left ear version of sound waves from a plurality of sources, combining all the right ear versions, combining all the left ear versions, thereby producing different compound waves comprising substantially similar components, in different phase relation, reproducing each compound wave, transmitting each reproduction independently to both ears of a listener in such a way that the earlier effect at one ear reaches the other ear after the later effect has reached the other ear, whereby similar components in different phase relation indicate characteristic angular directions for virtual origins.

In testimony whereof I have hereunto affixed my signature.

W. BARTLETT JONES.